United States Patent [19]

Warner

[11] 4,434,988
[45] Mar. 6, 1984

[54] SHAFT SEAL

[75] Inventor: Dale J. Warner, Palos Heights, Ill.

[73] Assignee: Gits Brothers Mfg. Co., Bedford Park, Ill.

[21] Appl. No.: 437,294

[22] Filed: Oct. 28, 1982

[51] Int. Cl.³ ............................................. F16J 15/34
[52] U.S. Cl. ............................... 277/81 R; 277/93 R
[58] Field of Search ................................. 277/38–42, 277/65, 81 R, 93

[56] References Cited
U.S. PATENT DOCUMENTS 3,527,511  9/1970  Whittle ................................ 277/93
4,296,935  10/1981  Inouye ............................ 277/81 R

OTHER PUBLICATIONS

Chesterton 770 Seal, Brochure C-121, English 40M 8-73, A. W. Chesterton Co., Stoneham, Mass. 02180.

Primary Examiner—Robert I. Smith
Attorney, Agent, or Firm—Hill, Van Santen, Steadman & Simpson

[57] ABSTRACT

A shaft seal comprises a holder carrying a carbon seal for rotation against an end surface of a stationary seal ring, the holder being coupled to a drive sleeve secured to a shaft of the machine which extends through an end wall which mounts the seal ring. The coupling is provided by drive lugs extending from the inboard end of the drive sleeve into slots within the seal holder. A seal is provided between the drive sleeve and the seal holder and is axially movable along a travel land which is equal to the travel land of axially longer shaft seals.

11 Claims, 4 Drawing Figures

SHAFT SEAL

BACKGROUND OF THE INVENTION

1. Field of the Invention

The present invention relates to a shaft seal, and is more particularly concerned with a seal for a shaft which extends through an end wall of a pump machine, such as a bell housing.

2. Description of the Prior Art

A shaft seal is manufactured by Gits Bros Mfg. Co., Bedfork Park, Ill., known as the Type 880, in which a drive sleeve is connected to a shaft and is coupled to rotate a seal holder whose seal member has a seal face which is rotatable against an end surface of a stationary seal ring. The coupling between the drive sleeve and the seal holder comprises a plurality of lugs extending from the seal holder parallel to the axis of rotation and received in slots which are formed in the outer peripheral surface of the drive sleeve. The seal holder includes an internal annular groove which carries an O-ring which bears against the outer surface of the drive sleeve. Also, in order to maintain the sealed relationship between the seal face and the stationary seal ring, springs are provided in the holder to bear against the end of the drive sleeve.

The drive sleeve includes, basically, two portions, an inboard portion which has threaded bores for receiving set screws to connect the sleeve to the shaft, an outboard portion having the slots therein for receiving the drive lugs and a groove for stress relief between the two portions. The outer surface of the second portion serves as a travel land for the O-ring and is limited, at the outboard end, by the stress relief groove and, at the inboard end, by the outboard ends of the drive lug slots.

SUMMARY OF THE INVENTION

The object of the present invention is to provide, in a seal structure of the type generally set forth above, a new and improved shaft seal which, for the same combination of lug length and travel land is axially shorter than that heretofore known in the art.

According to the invention, a drive sleeve is adapted for rotation with a shaft and a second sleeve telescopically receive thereover, a seal holder, is provided to hold a rotatable seal against an end surface of a seal ring. In a preferred embodiment, the drive sleeve is divided into two portions including a connection portion for connection to the shaft and a second portion for driving the holder, the two portions being separated by a stress relief groove. The holder driving portion includes a plurality of blind bores each of which mounts a drive lug at its inboard-facing end. The holder sleeve is provided with a plurality of spaced blind bores, each of which includes a spring extending therefrom to engage the outboard-facing end of the drive sleeve so as to urge the two sleeve apart. The holder sleeve also includes a plurality of slots for receiving the drive lugs which are secured in the drive sleeve. By placing the drive lug slots in the holder sleeve between blind bores for the biasing springs, the travel land, heretofore limited by the slots, now extends from the stress relief groove all the way to the inboard-facing end of the drive sleeve. Therefore, to achieve the same travel land as heretofore available, the drive sleeve can be made appreciably shorter. In one embodiment, this reduced the length of the seal from 1.750 inches to 1.5 inches using the same length of drive lug and the same length of spring.

A second advantage arises in that the use of material is reduced and the use of machining time is reduced.

A third and principle advantage arises concerning the location of the rotational drive closer to the face seal. Ideally, the drive should be centered at the seal face; however, this is not possible because of the use of carbon seal face held in a metal holder. Therefore, the drive connection between the drive sleeve and the holder must be at the metal holder. The closer the drive can be placed to the actual end face, the less tendency for inface wobble or orbit to occur with respect to the rotational movement of the sleeve—radial runout. Orbit or radial runout has the disadvantage of allowing a cocking of the two face seals which can open a half-moon-shaped leakage path. Additionally, orbiting causes a constant back and forth movement of the O-ring as the holder and drive sleeve are no longer concentric throughout the entire rotational cycle. This increases wear on the O-ring providing an early secondary leakage path.

BRIEF DESCRIPTION OF THE DRAWING

Other objects, features and advantages of the invention, its organization, construction and operation will be best understood from the following detailed description, taken in conjunction with the accompanying drawing. on which.

DESCRIPTION OF THE PREFERRED EMBODIMENTS

Figure 1:
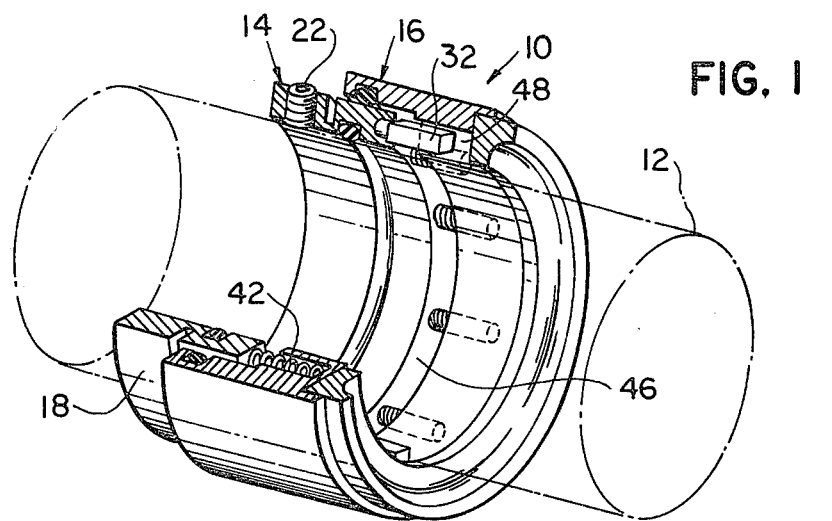
FIG. 1 is a perspective view, shown partially in section, of a shaft seal constructed in accordance with the present invention.

Referring to FIG. 1, a shaft seal is generally illustrated at 10 as being mounted on a shaft 12 (phantom) and comprises a drive sleeve assembly 14 and a ring seal assembly 16.

Figure 2:
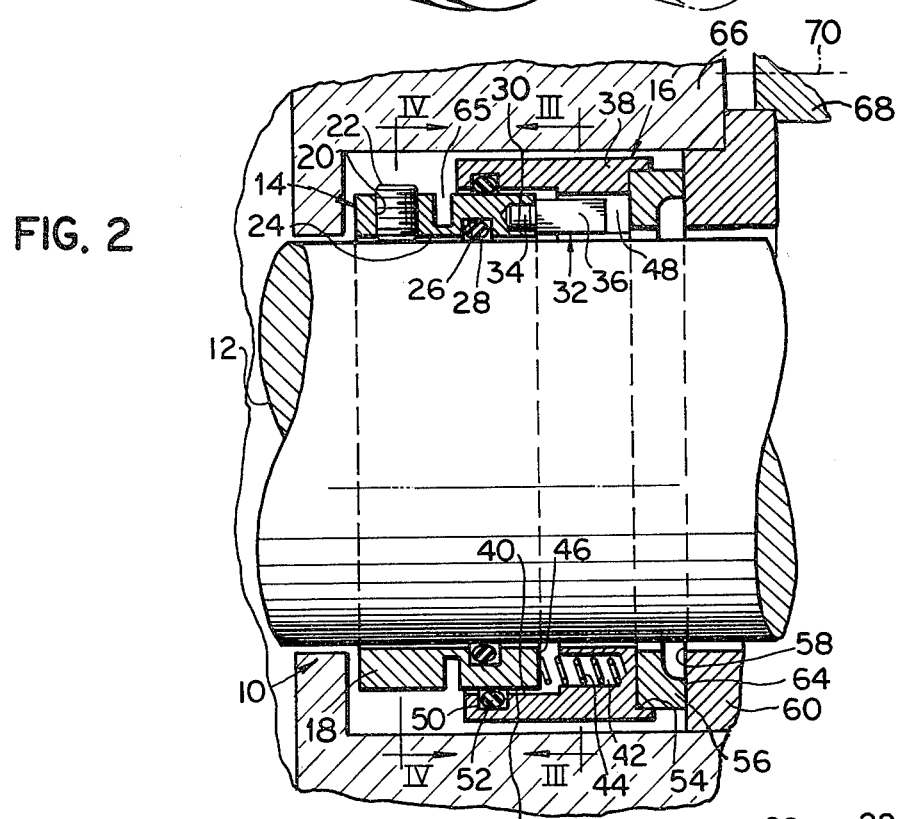
FIG. 2 is a sectional elevational view of a shaft seal constructed in accordance with the present invention and shown mounted on a shaft within, for example, a pump.

As illustrated in greater detail in FIG. 2, the drive sleeve assembly comprises a sleeve 18 of, for example, stainless steel, which includes a plurality of threaded bores 20 for receiving a corresponding plurality of set screws 22 for securing the sleeve to the shaft 12. The sleeve 18 comprises an inside surface 24 which includes an annular groove 26 having an O-ring 28 therein for sealing the sleeve 18 to the shaft 12.

The sleeve 18 includes an outboard end having a plurality of blind bores 30 therein, each of which receives a corresponding cylindrical section 34 of a drive lug 32, the extending portion 36 of the drive lug 32 being generally rectangular.

A second sleeve 38, namely a seal holder, is telescopically received over the drive sleeve 18 and includes an annular inside surface 40 and a plurality of blind bores 42 each of which has a spring 44 mounted therein to bear against the end surface 46 of the drive sleeve.

Figure 3:
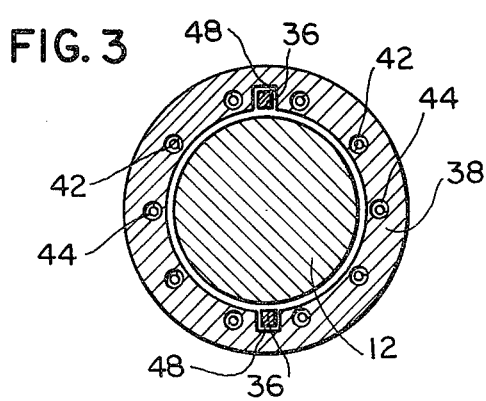
FIG. 3 is a sectional view taken generally along the parting line III—III, of FIG. 2.
Figure 4:
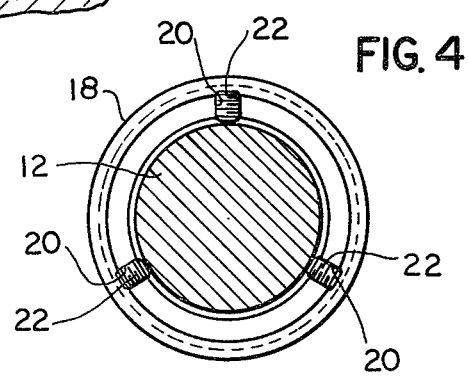
FIG. 4 is a sectional view taken generally along the part line IV—IV of FIG. 2.

As seen in FIG. 2, and as best seen in FIG. 3, the seal holder 38 comprises a plurality of slots 48, here two, for receiving the outwardly extending portions 36 of the drive lugs 32. As is apparent, the slots are greater in the actual direction than the corresponding dimensions of the drive lugs.

As illustrated in particular in the lower portion of FIG. 2, the drive sleeve 18 includes a surface which constitutes a travel land 62. Telescopically thereover is a portion of the seal holder 38 which includes a surface 40 having an annular groove 50 therein which carries an O-ring 52 which bears against the surface 62. Therefore, as the holder 38 moves axially, the O-ring 52 seals along the full axial extent of the surface 62.

At its outboard end, the holder 38 comprises an annular recess 54 which seats a seal 56 having an end face 64. The seal 56 may be, for example, carbon. The seal face 64 rotates against a surface 58 of a seal ring 60, which as indicated is secured to a gland 66 by way of a clamp ring 68 and a plurality of machine screws 70.

As mentioned above, the drive sleeve 18 may be provided with a stress relief in the form of a groove 65 which extends about the periphery of the drive sleeve and which divides the drive sleeve into a shaft connection portion and a seal holder coupling portion.

Advantageously, the shaft seal is hydraulically balanced, for example at 80:20 by the radial position of the outer diameter of the O-ring 52 with respect to the radial extent of the seal area of the seal face 64. This structure aids the springs 44 in applying closing forces between the seal face 64 and the surface 58 of the stationary seal ring 60.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a shaft seal for a rotatable shaft which extends through the end wall of a machine, of the type in which a drive sleeve assembly is fixed to the shaft for rotation therewith and fluid sealed to the shaft, in which a ring seal assembly rotates against a fixed seal ring and is urged thereagainst in a fluid sealed manner via spring means between the drive sleeve assembly and the ring seal assembly and by internal fluid pressure and is thereby fluid sealed to the drive sleeve assembly, and in which a drive coupling is provided between the drive sleeve assembly and the ring seal assembly, the improvement comprising:
   at least one drive lug fixed to the drive sleeve assembly and extending parallel to the axis of rotation of the shaft; and
   at least one recess in the ring seal assembly receiving said at least one drive lug for axial movement therein.

2. The improved shaft seal of claim 1, wherein a plurality of said drive lugs and a corresponding plurality of said recesses are provided.

3. The improved shaft seal of claim 2, wherein:
   the ring seal assembly includes bores and springs in said bores bearing against the drive sleeve assembly; and
   said bores and said recesses extend parallel to the axis of rotation of the shaft.

4. A shaft seal for sealed rotation against an end surface of a stationary seal ring of a machine with a rotatable shaft extending through the seal ring, comprising:
   an annular ring seal assembly receiving the shaft therethrough and including at least one recess and first sealing means comprising a surface for rotation against the end surface of the wall;
   a drive sleeve assembly for connection to the shaft and for mutual rotation therewith, said drive sleeve assembly including at least one drive lug received in said at least one recess for axial displacement therein;
   spring means bearing against said annular ring seal assembly and said drive sleeve assembly to urge the same apart;
   second sealing means between and fluid sealing the shaft and said drive sleeve assembly; and
   third sealing means between and fluid sealing said drive sleeve assembly and said annular ring assembly.

5. The shaft seal of claim 4, wherein: said annular ring seal assembly comprises, as said first sealing means, a carbon ring including a mating surface for engaging the end surface of the seal ring.

6. The shaft seal of claim 4, wherein: said annular ring seal assembly comprises a first portion which is telescopically received over a second portion of said drive sleeve assembly including an annular groove and an O-ring as said third sealing means, in said groove bearing against said groove in said second portion.

7. The shaft seal of claim 4, wherein:
   said drive sleeve assembly comprises an annular groove and an O-ring in said groove, as said second sealing means, bearing against said groove and the shaft.

8. A shaft seal for sealed rotation against an end surface of a sealing ring with a rotatable shaft extending through the ring comprising:
   a ring-shaped first sleeve for receiving the shaft therethrough including an axially extending first portion, an axially extending second portion, an outer surface and an inner surface;
   a first groove in said inner surface and a first O-ring in said first groove for fluid sealing said first sleeve to the shaft;
   connection means in said first portion for connecting said first sleeve to the shaft for rotation therewith;
   a plurality of drive lugs fixed to said second portion of said first sleeve and extending parallel to the axis of rotation;
   a ring-shaped second sleeve for receiving the shaft therethrough including a first portion, a second portion overlapping said second portion of said first sleeve, an inner surface and an outer surface;
   a second groove in said inner surface of said second portion of said second sleeve and a second O-ring in said second groove fluid sealing said second sleeve and said first sleeve;
   a plurality of slots in said inner surface of said first portion of said second sleeve extending parallel to the axis of rotation for telescopically receiving said drive lugs therein;
   a plurality of spaced-apart blind bores in said first portion of said second sleeve extending parallel to the axis of rotation;
   a plurality of springs in said blind bores bearing thereagainst and against said second portion of said first sleeve to urge said sleeves axially apart; and an annular seal carried by said second sleeve for receiving the shaft therethrough, said annular seal comprising an end face for fluid-sealed rotation against the end surface of the sealing ring.

9. The shaft seal of claim 8, wherein said ring-shaped first sleeve includes a plurality of spaced-apart blind bores in said second portion; and each of said drive lugs comprises a first portion secured in a respective blind bore of said ring-shaped first sleeve and a second portion received in a respective slot of said first portion of said second sleeve.

10. The shaft seal of claim 8, wherein said connection means comprises:

a plurality of radially-extending threaded bores through said first portion of said first sleeve; and a plurality of set screws in said threaded bores for securing said first sleeve to the shaft.

11. The shaft seal of claim 10, and further comprising:

an annular stress-relief groove about said first sleeve between said first and second portions, said stress-relief groove and the axial end of said second portion of said first sleeve defining the limits of a travel land for said second O-ring on said outer surface of said first sleeve.

* * * * *